US012632076B2

(12) United States Patent
Abraham et al.

(10) Patent No.: US 12,632,076 B2
(45) Date of Patent: May 19, 2026

(54) REFERENCE VOLTAGE GENERATOR USING A PAIR OF COMPLEMENTARY-TO-ABSOLUTE TEMPERATURE VOLTAGES

(71) Applicant: GlobalFoundries U.S. Inc., Malta, NY (US)

(72) Inventors: Nithin Thomas Abraham, Bangalore (IN); Balaji Sahebrao Rathod, Bangalore (IN); Asif Iqbal, Bangalore (IN)

(73) Assignee: GlobalFoundries U.S. Inc., Malta, NY (US)

( * ) Notice: Subject to any disclaimer, the term of this patent is extended or adjusted under 35 U.S.C. 154(b) by 0 days.

(21) Appl. No.: 18/748,212

(22) Filed: Jun. 20, 2024

(65) Prior Publication Data

US 2025/0390128 A1 Dec. 25, 2025

(51) Int. Cl.
*G05F 3/24* (2006.01)
*G05F 1/567* (2006.01)

(52) U.S. Cl.
CPC .............. *G05F 3/245* (2013.01); *G05F 1/567* (2013.01)

(58) Field of Classification Search
None
See application file for complete search history.

(56) References Cited

U.S. PATENT DOCUMENTS 6,985,040 B2 * 1/2006 Kim ..................... H03K 3/0315 331/16
7,295,069 B2 * 11/2007 Kim ..................... H03F 3/45183 330/261
7,880,532 B2 * 2/2011 Takaramoto .............. G05F 3/30 327/538
8,415,940 B2 * 4/2013 Yin .......................... G05F 3/267 323/314

(Continued)

OTHER PUBLICATIONS

Abraham et al., "MOSFET only low power sub-bandgap voltage reference by PTAT slope compensation," Original Article, Journal Selection, Department of Electronics and Communication, National Institute of Technology Calicut, Kerala, downloaded May 30, 2024, 17 pages.

(Continued)

*Primary Examiner* — Thomas J. Hiltunen
(74) *Attorney, Agent, or Firm* — David Cain; Hoffman Warnick LLC

(57) ABSTRACT

Disclosed are a structure and method for generating a reference voltage (VREF) that remains essentially constant in response variations in temperature and/or variations in a positive supply voltage. The structure can include a VREF generation circuit with a first stage for generating a first complementary-to-absolute temperature voltage (V_CTAT1), a second stage for generating a second complementary-to-absolute temperature voltage (V_CTAT2) higher than but exhibiting the same temperature-dependent rate of change as V_CTAT1, and an output stage for generating VREF as a function of the difference between V_CTAT2 and V_CTAT1 (e.g., VREF can be approximately equal to V_CTAT2 minus V_CTAT1). In this structure, the same bias voltage (VBIAS) is employed for each stage and all transistors can be metal oxide semiconductor field effect transistors (MOSFETs). With the disclosed configuration, a more stable VREF across a wider temperature range and/or VDD range is achievable and the structure may consume less chip area.

18 Claims, 7 Drawing Sheets

(56) References Cited

U.S. PATENT DOCUMENTS

| | | | | |
|---|---|---|---|---|
| 8,575,998 | B2 * | 11/2013 | Huang | G05F 3/245<br>327/541 |
| 8,896,378 | B2 * | 11/2014 | Hirose | H03F 3/45179<br>330/259 |
| 9,112,510 | B2 * | 8/2015 | Ishikawa | H03F 3/45183 |
| 9,595,340 | B2 * | 3/2017 | Chen | G11C 7/14 |
| 10,355,649 | B2 * | 7/2019 | Blanc | G05F 3/30 |
| 11,137,788 | B2 * | 10/2021 | Panja | G05F 3/267 |
| 2005/0285666 | A1 | 12/2005 | Garlapati et al. | |
| 2024/0267034 | A1 * | 8/2024 | Park | H03L 1/022 |

OTHER PUBLICATIONS

Golhani et al., “A Low Voltage Low Power Wide Supply CMOS Current Mode Bandgap Voltage Reference,” 2021 IEEE Bombay Section Signature Conference (IBSSC), downloaded on May 30, 2024, 5 pages.

Hande et al., “A survey of bandgap and non-bandgap based voltage reference techniques,” Scientia Iranica D, Oct. 29, 2016, 23(6), 2845-2861.

Huang et al., “A Sub-200nW All-in-One Bandgap Voltage and Current Reference Without Amplifiers,” IEEE Transactions on Circuits and Systems II: Express Briefs, vol. 68, No. 1, Jan. 2021, 5 pages.

Lee et al., “A Sub-μ W Bandgap Reference Circuit With an Inherent Curvature-Compensation Property,” IEEE Transactions on Circuits and Systems I: Regular Papers, vol. 62., No. 1, Jan. 2015, 9 pages.

Theja et al., “Design of Bandgap Voltage Reference Circuit with Low TC and High PSRR in 180nm CMOS Technology,” International Journal of Creative Research Thoughts (IJCRT), vol. 10, Issue 6, Jun. 2022, 4 pages.

Zhu et al., “A Novel Low Voltage Subtracting Bandgap Reference with Temperature Coefficient of 2.2ppm/°C.,” 2011 IEEE, downloaded May 30, 2024, 4 pages.

* cited by examiner

REFERENCE VOLTAGE GENERATOR USING A PAIR OF COMPLEMENTARY-TO-ABSOLUTE TEMPERATURE VOLTAGES

BACKGROUND

Embodiments disclosed herein relate to reference voltage generation and, more particularly, to embodiments of a circuit and a method for generating a reference voltage (VREF) that is effectively constant.

Conventional circuits for generating a reference voltage (VREF) that is independent of changes in temperature (i.e., a constant VREF) are often difficult to calibrate and have limited functionality. For example, a conventional VREF generation circuit may be configured to generate a complementary-to-absolute temperature voltage (V_CTAT) (i.e., a voltage that decreases with increases in temperature), to generate a proportional-to-absolute temperature voltage (V_PTAT) (i.e., a voltage that increases with increases in temperature), and to generate VREF by adding V_CTAT and V_PTAT. VREF can, however, vary if V_CTAT and/or V_PTAT is/are non-linear. Additionally, when the temperature rises above a given temperature (e.g., above 130° Celsius (C)), VREF may be significantly pulled down or pulled up depending upon whether V_CTAT or V_PTAT is the dominant non-linear voltage component. Furthermore, a conventional VREF generation circuit will typically employ at least some bipolar junction transistors (BJTs) (e.g., either all BJTs or a combination of BJTs and metal oxide semiconductor field effect transistors (MOSFETs)) and, thus, will consume a significant amount of chip area.

SUMMARY

Disclosed herein embodiments of a structure for generating a reference voltage (VREF). Generally, the structure can include a first stage, a second stage, and an output stage. The output stage can be connected to receive a first complementary-to-absolute temperature voltage (V_CTAT1) from the first stage and a second complementary-to-absolute temperature voltage (V_CTAT2) from the second stage. V_CTAT2 can specifically be higher than V_CTAT1 but the two voltages can change at the same rate in response to changes in temperature. The output stage can further output a reference voltage (VREF), where the voltage level of VREF is dependent on a difference between V_CTAT2 and V_CTAT1.

More specifically, some embodiments of the structure can include a first stage, a second stage, and an output stage. The first stage can include a first N-type field effect transistor (NFET) and a first P-type field effect transistor (PFET) connected in series. The first stage can further include a first intermediate node between the first NFET and the first PFET. Additionally, the first stage can output V_CTAT1 at the first intermediate node. The second stage can be parallel to the first stage and can include a second NFET, a third NFET, and a second PFET connected in series. The second stage can further include a second intermediate node between the third NFET and the second PFET. Additionally, the second stage can output V_CTAT2 at the second intermediate node. V_CTAT2 can specifically be higher than V_CTAT1 but the two voltages can change at the same rate in response to changes in temperature. The output stage can be parallel to the first and second stages and can include a fourth NFET, a fifth NFET, and a third PFET connected in series. The fourth NFET and the fifth NFET can have front gates connected to receive V_CTAT1 and V_CTAT2, respectively. The output stage can have an output node between the fourth NFET and the fifth NFET. Additionally, the output stage can output a VREF at the output node and the voltage level of VREF can depend on the difference between V_CTAT2 and V_CTAT1.

Also disclosed herein are method embodiments for generating a VREF. The method embodiments can include generating a V_CTAT1 and generating a V_CTAT2. V_CTAT2 and V_CTAT1 can be generated so that V_CTAT2 is higher than V_CTAT1 and further so that the two voltages change at the same rate in response to changes in temperature. The method can further include generating a VREF, where the voltage level of the VREF depends on the difference between V_CTAT2 and V_CTAT1.

It should be noted that all aspects, examples, and features of disclosed embodiments mentioned in the summary above can be combined in any technically possible way. That is, two or more aspects of any of the disclosed embodiments, including those described in this summary section, may be combined to form implementations not specifically described herein. The details of one or more implementations are set forth in the accompanying drawings and the description below. Other features, objects and advantages will be apparent from the description and drawings, and from the claims.

BRIEF DESCRIPTION OF THE DRAWINGS

The present disclosure will be better understood from the following detailed description with reference to the drawings, which are not necessarily drawn to scale and in which.

DETAILED DESCRIPTION

As mentioned above, conventional circuits for generating a reference voltage (VREF) that is independent of changes in temperature (i.e., a constant VREF) are often difficult to calibrate and have limited functionality. For example, a conventional VREF generation circuit may be configured to generate a complementary-to-absolute temperature voltage (V_CTAT) (i.e., a voltage that decreases with increases in temperature), to generate a proportional-to-absolute temperature voltage (V_PTAT) (i.e., a voltage that increases with increases in temperature), and to generate VREF by adding V_CTAT and V_PTAT. VREF can, however, vary if V_CTAT and/or V_PTAT is/are non-linear. Additionally, when the temperature rises above a given temperature (e.g., above 130° Celsius (C)), VREF may be significantly pulled down or pulled up depending upon whether V_CTAT or V_PTAT is the dominant non-linear voltage component. Furthermore, a conventional VREF generation circuit will typically employ at least some bipolar junction transistors (BJTs) (e.g., either all BJTs or a combination of BJTs and metal oxide semiconductor field effect transistors (MOSFETs)) and, thus, will consume a significant amount of chip area.

In view of the foregoing, disclosed herein are embodiments of a structure and a method for generating a reference voltage (VREF) that remains essentially constant in response variations in temperature and/or variations in a positive supply voltage. The structure can include a VREF generation circuit with multiple stages. The multiple stages can include a first stage for generating a first complementary-to-absolute temperature voltage (V_CTAT1) and a second stage for generating a second complementary-to-absolute temperature voltage (V_CTAT2) higher than but exhibiting the same temperature-dependent rate of change as V_CTAT1. The multiple stages can also include an output stage for generating VREF at an essentially constant voltage level as a function of the difference between V_CTAT1 and V_CTAT2 (e.g., VREF can be approximately equal to V_CTAT2 minus V_CTAT1), as discussed in greater detail below. The structure can also include a bias voltage (VBIAS) generation circuit, which generates a VBIAS employed in each stage of the VREF generation circuit. Additionally, all transistors within the structure can be metal oxide semiconductor field effect transistors (MOSFETs). With the disclosed configuration, a more stable VREF across a wider temperature range and/or VDD range is achievable. Furthermore, since bipolar junction transistors (BJTs) are not employed, the structure may consume less chip area.

Figure 1:
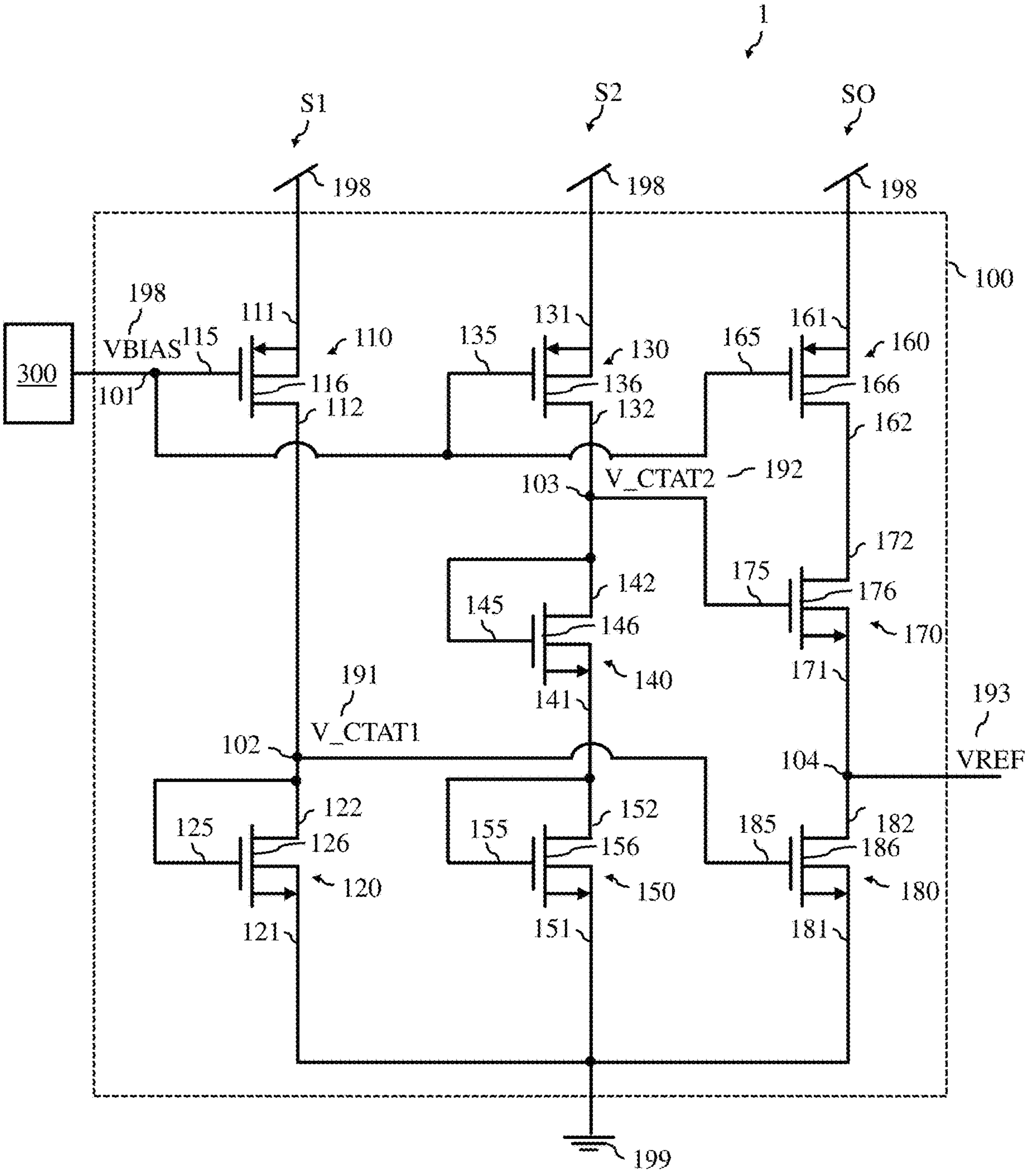
FIG. 1 is a schematic diagram illustrating embodiments of a disclosed structure.

FIG. 1 is a schematic diagram illustrating disclosed embodiments of a structure 1. Structure 1 can include a reference voltage (VREF) generation circuit 100 for generating a VREF that remains essentially constant in response variations in temperature and/or variations in a positive supply voltage (VDD). For purposes of this disclosure an essentially constant VREF refers, for example, a VREF that varies (i.e., increases or decreases) by no more than 10% and ideally by no more than 5% (e.g., by less than 1%).

VREF generation circuit 100 can include three parallel stages and, particularly: a first stage (S1); a second stage (S2); and an output stage (SO). VREF generation circuit 100 can further include an input node 101 electrically connected to S1, S2 and SO and an output node 104 within SO. As discussed in greater detail below, each of these stages (S1, S2, and SO) can include multiple transistors.

Each of these transistors can be a metal oxide semiconductor field effect transistor (MOSFET). As discussed in greater detail below, some of these MOSFETs can be N-type field effect transistors (NFETs) and others can be P-type field effect transistors (PFETs). Optionally, these MOSFETs can be dual-gate semiconductor-on-insulator MOSFETs (e.g., dual-gated silicon-on-insulator (SOI) MOSFETs). Such dual-gate semiconductor-on-insulator MOSFETs can be either fully-depleted semiconductor-on-insulator MOSFETs (e.g., fully-depleted SOI (FDSOI) MOSFETs) or partially-depleted semiconductor-on-insulator MOSFETs (e.g., partially-depleted SOI (PDSOI) MOSFETs). Alternatively, the MOSFETs could be any other suitable type of MOSFET.

Figure 2:
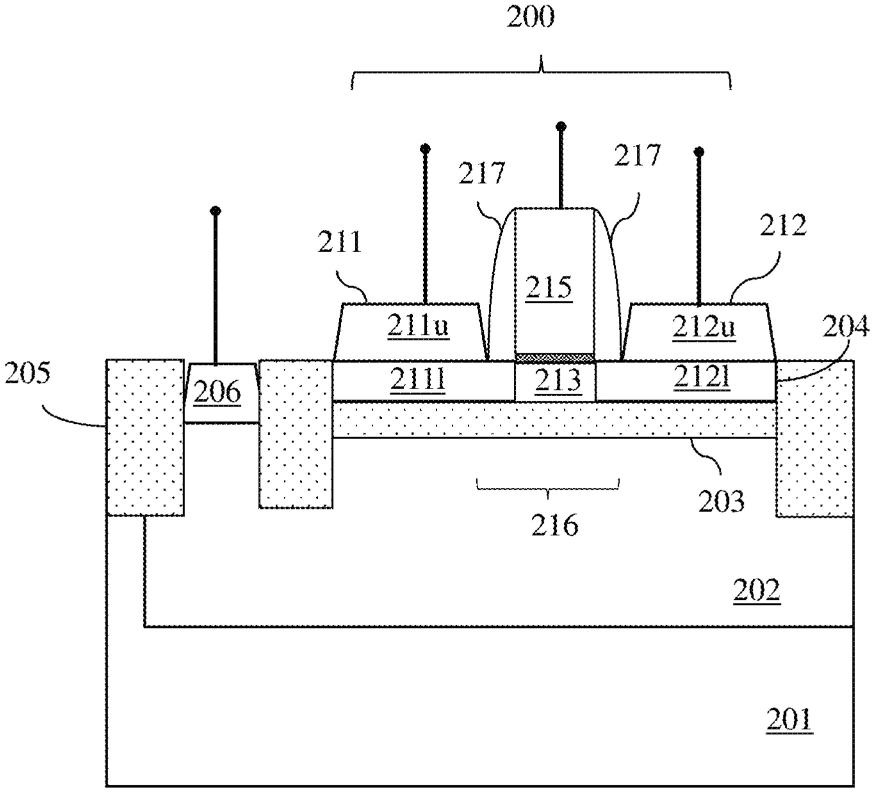
FIG. 2 is a cross-section diagram illustrating an example of a transistor that can be incorporated into the structure of FIG. 1.

FIG. 2 is a cross-section diagram illustrating one example of a dual-gated semiconductor-on-insulator MOSFET (referred to hereinafter as MOSFET 200) that can be incorporated into structure 1. Specifically, FIG. 2 illustrates a semiconductor substrate 201. Semiconductor substrate 201 can be, for example, a monocrystalline silicon substrate or, alternatively, a monocrystalline substrate of any other suitable semiconductor material (e.g., silicon germanium, etc.). An insulator layer 203 can be on the top surface of semiconductor substrate 201. Insulator layer 203 can be, for example, a silicon dioxide layer or a layer of any other suitable insulator material. A semiconductor layer 204 can be on the top surface of insulator layer 203. Semiconductor layer 204 can be, for example, a monocrystalline silicon layer or a layer of any other suitable monocrystalline semiconductor material (e.g., silicon germanium, etc.).

Trench isolation regions 205 (e.g., shallow trench isolation (STI) structures) can at least partially define an active device region of MOSFET 200 within semiconductor layer 204. Such STI structures can include, for example, one or more trenches patterned (e.g., lithographically or otherwise) and etched so as to extend vertically from the top surface of semiconductor layer 204 to and, optionally, through insulator layer 203. The trench(es) can be filled with one or more layers of isolation materials (e.g., silicon dioxide, silicon nitride, silicon oxynitride, etc.), thereby forming the STI structures. Such STI structures can laterally surround the active device region of MOSFET. Alternatively, such STI structures can laterally surround a portion of semiconductor layer 204 including multiple active device regions for laterally adjacent MOSFETs that, for example, share a source/drain region.

MOSFET 200 can include, within its active device region, a channel region 213 positioned laterally between a source region 211 and a drain region 212. Source/drain regions 211-212 can include lower source/drain portions 211*l*-212*l* including doped regions of semiconductor layer 204 on either side of channel region 213. Optionally, source/drain regions 211-212 can further include upper source/drain portions 211*u*-212*u* (also referred to herein as raised source/drain regions) above and immediately adjacent to lower source/drain portions 211*l*-212*l*, respectively. Upper source/drain portions 211*u*-212*u* can include epitaxially grown monocrystalline semiconductor layers (e.g., epitaxially grown silicon layers). Those skilled in the art will recognize that, in an NFET, source/drain regions 211-212 can be doped so as to have N-type conductivity at a relatively high conductivity level and channel region 213 can be either intrinsic (i.e., undoped) or doped so as to have P-type conductivity at a relatively low conductivity level. In a PFET, source/drain regions 211-212 can be doped so as to have P-type conductivity at a relatively high conductivity level and channel region 213 can be either intrinsic (i.e., undoped) or doped so as to have N-type conductivity at a relatively low conductivity level.

MOSFET 200 can further include a front gate 215 (also referred to herein as a primary gate) adjacent to (e.g., above, and immediately adjacent to) the active device region at channel region 213. Front gate 215 can include a gate dielectric layer (including one or more layers of gate dielectric material) immediately adjacent to channel region 213 and a gate conductor layer (including one or more layers of gate conductor material) on the gate dielectric layer. Front gate 215 could be any of a gate-first polysilicon gate structure, a gate-first high-K metal gate (HKMG) structure, a gate-last HKMG structure (also referred to as a replacement metal gate (RMG) structure), or any other suitable type of front gate structure. Gate sidewall spacers 217 can further be positioned laterally adjacent to sidewalls of front gate 215 to electrically isolate it from the adjacent source/drain regions 211-212. Front gate structures with gate sidewall spacers are well known in the art and, thus, the details thereof have been omitted from the specification in order to allow the reader to focus on the salient aspects of the disclosed embodiments.

MOSFET 200 can further include a back gate 216 (also referred to herein as a secondary gate). Specifically, semiconductor substrate 201 can include a well region 202 therein. Well region 202 can be located at the top surface of semiconductor substrate 201 immediately adjacent insulator layer 203 and can further be aligned below the active device region. For purposes of this disclosure, a well region refers to a region of semiconductor material doped (e.g., via a dopant implantation process or any other suitable doping process) so as to have a particular conductivity type.

Those skilled in the art will recognize that one advantage of advanced semiconductor-on-insulator technology processing platforms is that MOSFETs can be formed on an insulator layer above a particular type of well region (e.g., an N-type well region (Nwell) or a P-type well region (Pwell)) in order to achieve different types of NFETs or PFETs with different threshold voltages (VTs). For example, for a super low threshold voltage (SLVT) or low threshold voltage (LVT) FET, an NFET can be formed above an Nwell and a PFET can be formed above a Pwell. For a regular threshold voltage (RVT) or high threshold voltage (HVT) FET, an NFET can be formed above a Pwell and a PFET can be formed above an Nwell. Typically, a circuit block will include all SLVT (or LVT) FETs with NFETs above Nwells and PFETs above Pwells or all RVT (or HVT) FETs with NFETs above Pwells and PFETs above Nwells. Whether the FETs are SLVT or LVT FETs or whether they are RVT or HVT FETs will depend upon the design (e.g., device size, etc.) and process specifications (e.g., dopant concentrations, etc.). In some embodiments of structure 1 disclosed herein NFETs can be aligned above Nwell(s) (e.g., a shared Nwell, corresponding Nwells, or a combination thereof) and PFETs can be aligned above Pwell(s) (e.g., a shared Pwell, corresponding Pwells or a combination thereof) such that all transistors within structure 1 are either LVT or SLVT transistors.

Another advantage of advanced semiconductor-on-insulator technology processing platforms is that portions of the insulator layer and well regions aligned below a MOSFET effectively form a back gate, which can be biased (referred to as back gate biasing or back-biasing) to fine tune the threshold voltage. Forward back-biasing (FBB) refers to applying a gate bias voltage to the back gate (particularly, to the well region thereof) to reduce VT. Reverse back-biasing (RBB) refers specifically to applying a gate bias voltage to the back gate (particularly, to the well region thereof) to increase VT. Thus, in MOSFET 200, portions of insulator layer 203 and well region 202 aligned below channel region 213 effectively form back gate 216.

A well region 202 can be contacted by a well contact region 206 (also referred to herein as a well tap) to facilitate back gate biasing. Specifically, MOSFET 200 can include a bulk region (also referred to as a hybrid region). This bulk region can be devoid of insulator layer 203 and instead can include well contact region 206 at the top surface of semiconductor substrate 201 immediately adjacent to well region 202 and electrically isolated from the active device region of by STI structures. Well contact region 206 can include, for example, an epitaxial monocrystalline semiconductor layer (e.g., an epitaxial silicon layer or an epitaxial layer of any other suitable semiconductor material), which is grown on the top surface of semiconductor substrate 201 immediately adjacent to well region 202 and either in situ doped or subsequently implanted so as to have the same type conductivity as well region 202 but at a higher conductivity level. Alternatively, well contact region 206 could be a highly doped region within and at the top surface of well region 202. Given the above-described structure, front gate 215 and back gate 216 are independently biasable. That is, they can be biased with the same or different bias voltages.

Referring again to FIG. 1, S1 of VREF generation circuit 100 can include a first N-type field effect transistor (first NFET) 120 and a first P-type field effect transistor (first PFET 110) connected in series between a ground rail 199 and a positive supply voltage rail 198 at a positive supply voltage (VDD). Specifically, first NFET 120 can include: source region 121, which is electrically connected to ground rail 199; drain region 122; and a channel region between source region 121 and drain region 122. First NFET 120 can further include a front gate 125 tied to drain region 122 and a back gate 126 tied to source region 121. First PFET 110 can include: source region 111, which is electrically connected to positive supply voltage rail 198; drain region 112, which is electrically connected to drain region 122 of first NFET 120; and a channel region between source region 111 and drain region 112. First PFET 110 can further include a front gate 115 electrically connected to input node 101 and a back gate 116 tied to source region 111. S1 can further include a first intermediate node 102 at the connection between drain region 122 of first NFET 120 and drain region 112 of first PFET 110.

S2 of VREF generation circuit 100 can include a second NFET 150, a third NFET 140, and a second PFET 130 connected in series between ground rail 199 and positive supply voltage rail 198. Specifically, second NFET 150 can include: source region 151, which is electrically connected to ground rail 199; drain region 152; and a channel region between source region 151 and drain region 152. Second NFET 150 can further include a front gate 155 tied to drain region 152 and a back gate 156 tied to source region 151. Third NFET 140 can include: source region 141, which is electrically connected to drain region 152 of second NFET 150; drain region 142; and a channel region between source region 141 and drain region 142. Third NFET 140 can further include a front gate 145 tied to drain region 142 and a back gate 146 tied to source region 141. Second PFET 130 can include: source region 131, which is electrically connected to positive supply voltage rail 198; drain region 132, which is electrically connected to drain region 142 of third NFET 140; and a channel region between source region 131 and drain region 132. Second PFET 130 can further include a front gate 135 electrically connected to input node 101 and a back gate 136 tied to source region 131. S2 can further include a second intermediate node 103 at the connection between drain region 142 of third NFET 140 and drain region 132 of second PFET 130.

SO of VREF generation circuit 100 can include fourth NFET 180, a fifth NFET 170, and a third PFET 160 connected in series between ground rail 199 and positive supply voltage rail 198. Specifically, fourth NFET 180 can include: source region 181, which is electrically connected to ground rail 199; drain region 182; and a channel region between source region 181 and drain region 182. Fourth NFET 180 can further include a front gate 185 tied to first intermediate node 102 of S1 and a back gate 186 tied to source region 181. Fifth NFET 170 can include: source region 171, which is electrically connected to drain region 182 of fourth NFET 180; drain region 172; and a channel region between source region 171 and drain region 172. Fifth NFET 170 can further include a front gate 175 tied second intermediate node 103 of S2 and a back gate 176 tied to source region 171. Third PFET 160 can include: source region 161, which is electrically connected to positive supply voltage rail 198; drain region 162, which is electrically connected to drain region 172 of fifth NFET 170; and a channel region between source region 161 and drain region 162. Third PFET 160 can further include a front gate 165 electrically connected to input node 101 and a back gate 166 tied to source region 161. SO can further include output node 104 at the connection between drain region 182 of fourth NFET 180 and source region 171 of fifth NFET 170.

It should be noted that, within structure 1, first PFET 110 in S1, second PFET 130 in S2, and third PFET 160 in SO can all have the same PFET design specifications (i.e., can be the same-type PFET, same size-PFET, etc.). Thus, when the same bias voltage (VBIAS) (as discussed in greater detail below) is applied, via input node 101, to front gate 115 of first PFET 110, to front gate 135 of second PFET 130, and to front gate 165 of third PFET 160, the same amount of current flows through first PFET 110, second PFET 130, and third PFET 160. Additionally, within structure 1, fourth NFET 180 and fifth NFET 170 in SO can have the same NFET design specifications (i.e., can be the same-type NFET, same size-NFET, etc.) so the same amount of current flows therethrough. Similarly, second NFET 150 and third NFET 140 in S2 can have the same NFET design specifications (i.e., can be the same-type NFET, same size-NFET, etc.) and these NFET specifications can be either the same as or different from the NFET design specifications used for fourth NFET 180 and fifth NFET 170 in SO. Finally, first NFET 120 in S1 will have different NFET design specifications than second NFET 150 and third NFET 140. More specifically, first NFET 120 will be larger in size (e.g., have a longer channel length) than second NFET 150 and third NFET 140 (see also the detailed discussion below regarding the relationship between the sizes of the NFETs in S1 and S2 and the voltage levels of complementary-to-absolute temperature voltages (V_CTATs) on intermediate nodes 102 and 103, respectively).

Figure 3:
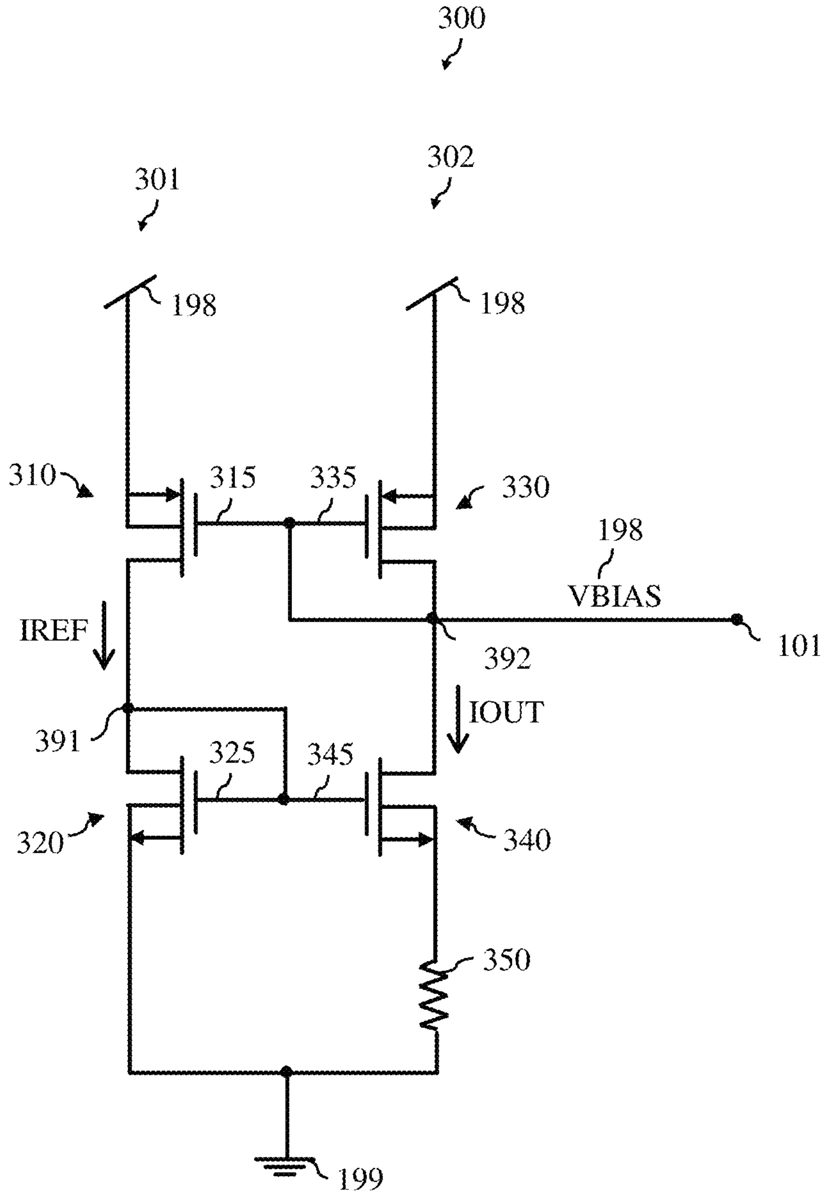
FIG. 3 is a schematic diagram illustrating an example of a bias voltage generation circuit that can be incorporated into the structure of FIG. 1.

Structure 1 can further include a VBIAS generation circuit 300. VBIAS generation circuit 300 can be configured to generate a bias voltage (VBIAS) and to output VBIAS to input node 101 of VREF generation circuit 100. VBIAS should be independent of the positive supply voltage (VDD) and relatively constant (e.g., with only minor variations, such variations of plus or minus 15%) to facilitate generation of relatively constant and equal currents through first PFET 110 in S1, second PFET 130 in S2, and third PFET 160 in SO. FIG. 3 is a schematic diagram illustrating one example of a VBIAS generation circuit 300 that could be incorporated into structure 1 for providing VBIAS to VREF generation circuit 100. As illustrated, VBIAS generation circuit 300 can be a self-biasing circuit including two branches 301 and 302 connected in parallel between the positive supply voltage rail 198 and ground rail 199. A first branch 301 can include a PFET 310 and an NFET 320 connected in series between positive supply voltage rail 198 and ground. A second branch 302 can include a PFET 330, an NFET 340, and a resistor 350 connected in series between positive supply voltage rail 198 and ground rail 199. PFET 310, NFET 320, PFET 330, and NFET 340 can each be configured essentially the same as MOSFET 200 described in detail above and illustrated in FIG. 2. Optionally, as illustrated, back gates of PFET 310, NFET 320, PFET 330, and NFET 340 can be tied to their respective source regions. In any case, front gates 325 and 345 of NFETs 320 and 340 can be connected to an intermediate node 391 at which the drain regions of PFET 310 and NFET 320 are electrically connected. Additionally, front gates 315 and 335 of PFETs 310 and 330 can be connected to an VBIAS output node 392 at which drain regions of PFET 330 and NFET 340 are electrically connected. As a result, a reference current (IREF) will be generated within first branch 301 across intermediate node 391, an output current (IOUT) proportional to IREF will be generated in second branch 302 across VBIAS output node 392, and VBIAS will be generated on VBIAS output node 392. Those skilled in the art will recognize that various design specifications for PFETs 310 and 330, NFETs 320 and 340 and resistor 350 (e.g., channel width (W)/channel length (L) for the transistors, resistance of the resistor, etc.) can be selected to achieve the desired IOUT and, thereby the desired VBIAS. It should be understood that the VBIAS generation circuit shown in FIG. 3 is provided for illustration purposes and is not intended to be limiting. Alternatively, any other suitable VBIAS generation circuit could be incorporated into structure 1 of FIG. 1 as VBIAS generation circuit 300.

Referring again to FIG. 1, in VREF generation circuit 100, VBIAS on input node and, thereby on front gates 115, 135, and 165 will control current flow through first PFET 110, second PFET 130, and third PFET 160. The voltage level of VBIAS can be any suitable voltage level that results in current flow through first PFET 110, second PFET 130, and third PFET 160 and thereby through S1, S2, and SO. In response to VBIAS, within S1, a first complementary-to-absolute temperature voltage (V-CTAT1) 191 will be exhibited on first intermediate node 102. Additionally, within S2, a second complementary-to-absolute temperature voltage (V-CTAT2) 192 will be exhibited on second intermediate node 103. For purposes of this disclosure, a complementary-to-absolute temperature voltage (V_CTAT) refers to voltage that decreases with increases in temperature. In the disclosed embodiments, V_CTAT2 should be at a higher voltage level than V_CTAT1, but the temperature-dependent rate of change of V_CTAT1 and V_CTAT2 should be essentially the same. That is, when plotted, the slope of lines representing V_CTAT1 and V_CTAT2 will be approximately equal across a given temperature range. Such conditions are created due to the extra NFET within S2 as compared to S1 and due to the relatively large size of first NFET 120 within S1 as compared to the sizes of the second NFET 150 and third NFET 140 within S2.

More specifically, those skilled in the art will recognize that stacking of second NFET 150 and third NFET 140 in S2 will ensure a relatively high V_CTAT2 on second intermediately node 103 as compared to V_CTAT1 on first intermediate node 102 in S1. However, stacking of second NFET 150 and third NFET 140 will also cause the temperature-dependent rate of change of V_CTAT2 on second intermediate node 103 to be increased (e.g., essentially doubled when second NFET 150 and third NFET 140 have the same design specifications). The disclosed embodiments, however, require V_CTAT1 to be at a lower voltage level than V_CTAT2 but have essentially the same temperature-dependent rate of change. Thus, in structure 1, first NFET 120 in S1 must be relatively large compared to second NFET 150 and third NFET 140 in S2 to similarly increase the temperature-dependent rate of change of V_CTAT1. For example, to ensure that the temperature-dependent rate of change of V_CTAT1 is equal to the temperature-dependent rate of change of V_CTAT2, the size of first NFET 120 can be adjusted during design relative to the sizes of second NFET 150 and third NFET 140 in S1 (e.g., the channel length of first NFET 120 can be increased relative to the channel lengths of the second NFET 150 and third NFET 140).

Figure 4:
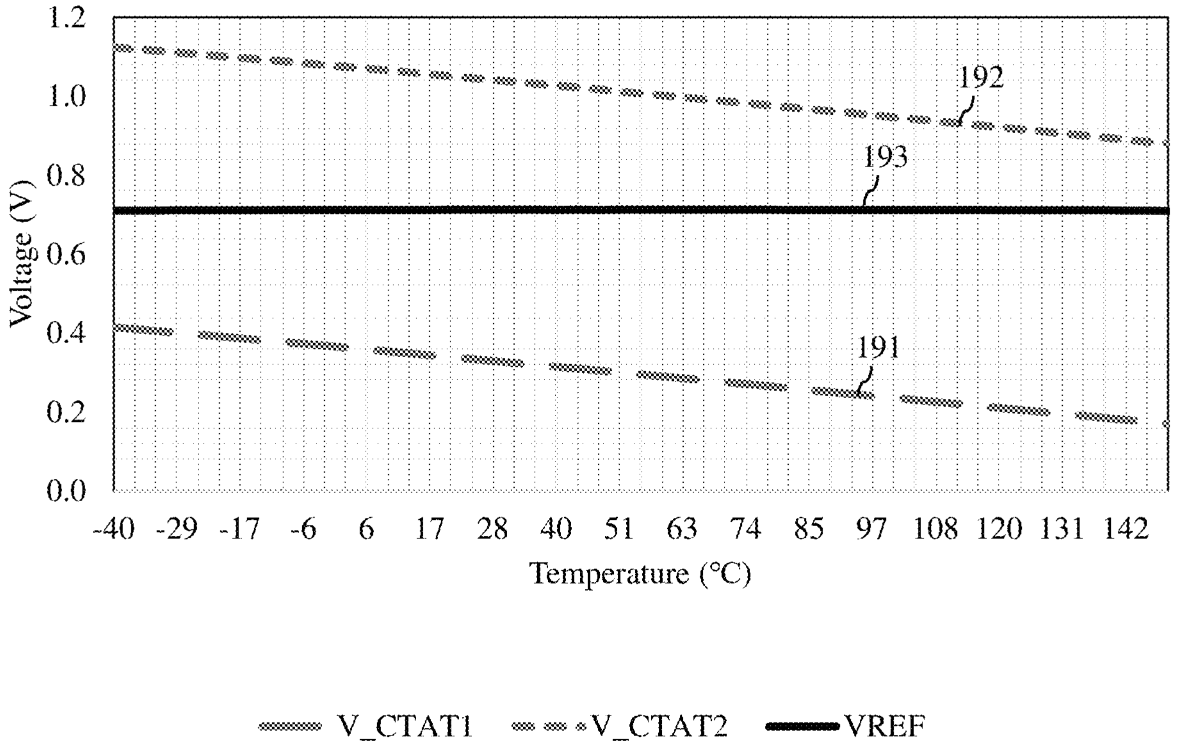
FIG. 4 is a voltage-temperature diagram illustrating the relationship between changes in voltage and changes in temperature for a first complementary-to-absolute temperature voltage (V_CTAT1), a second complementary-to-absolute temperature voltage (V_CTAT2), and a reference voltage (VREF) that may be generated by the structure of FIG. 1.

Thus, for example, FIG. 4 is a graph illustrating changes in V_CTAT1 and V_CTAT1 across a range of temperatures (e.g., from −40° C. to 150° C.). As illustrated, V_CTAT1 191 decreases from approximately 400 mV to approximately 200 mV between −40° C. to 150° C., whereas V_CTAT2 decreases from approximately 1100 mV to approximately 900 mV between −40° C. to 150° C. That is, across the full range of temperatures from −40° C. to 150° C., V_CTAT1 and V_CTAT2 each only change by a total of 200 mV and the slopes associated with the plotted lines representing V_CTAT1 191 and V_CTAT2 192 are approximately equal.

Additionally, since front gate 185 of fourth NFET 180 is tied to first intermediate node 102 and since front gate 175 of fifth NFET 170 is tied to second intermediate node 103, fourth NFET 180 and fifth NFET 170 are controlled by V_CTAT1 and V_CTAT2, respectively. Since the same current flows through fourth NFET 180 and fifth NFET 170, VREF 193 output at output node 104 of SO will be essentially constant at a voltage level between V_CTAT1 and V_CTAT2 and will depend on the difference between V_CTAT1 191 and V_CTAT2 192, as shown in FIG. 4. More particularly, VREF can be determined by solving the following equation:

$$VREF = \text{V\_CTAT2} - \text{V\_CTAT1}. \tag{1}$$

It should be noted that, by connecting the back gates of the transistors to their respective source regions in the disclosed structure, any impact of the substrate on operation of the fourth NFET 180 or the fifth NFET 170 is minimized so VREF will be essentially equal to V_CTAT2-V-CTAT1. Equation (1) can be set up as follows.

$$VGS5 - VGS4 = \text{V\_CTAT2} - VREF - \text{V\_CTAT1}, \tag{2}$$

where VGS5 is the gate-source voltage of fifth NFET 170 and VGS4 is the gate-source voltage of the fourth NFET 180. Furthermore, the gate-source voltage of each transistor can be determined using the following equation:

$$VGS = VTH + (2 * ID/gm), \tag{3}$$

where VTH is the threshold voltage of the transistor, ID is drain current associated with each PFET 110, 130, and 160, and gm is the transconductance of the transistor. Thus, equation (3) can be substituted into equation (2) as follows:

$$(VTH5 + (2 * ID/gm5)) - (VTH4 + (2 * ID/gm4)) = \text{V\_CTAT2} - VREF - \text{V\_CTAT1}. \tag{4}$$

Since, as discussed above, in SO, fourth NFET 180 and fifth NFET 170 have the same NFET design specifications, it can be assumed that these NFETs also have the same threshold voltage and the same transconductance value. That is:

$$VTH5 = VTH4, \text{ and} \tag{5}$$

$$gm5 = gm4. \tag{6}$$

Thus, equation (4) can be simplified as follows:

$$(VTH + (2 * ID/gm)) - (VTH + (2 * ID/gm)) = \text{V\_CTAT2} - VREF - \text{V\_CTAT1}, \tag{6}$$

And, thus, $$VREF = \text{V\_CTAT1} - VREF - \text{V\_CTAT1}. \tag{7}$$

Additionally, V_CTAT1 and V_CTAT2 can be determined as follows:

$$V_{CTAT1} = mV_T\left(\frac{I_D}{2\mu C_{ox} V_T^2\left(\frac{W}{L}\right)}\right) + V_{th}, \text{ and} \tag{8}$$

where m is the subthreshold slope factor, $V_T$ is the voltage equivalent of temperature, u is the electron mobility, $C_{ox}$ is the oxide capacitance, W is the width of NFET 120, L is the length of first NFET 120, and Vth is the threshold voltage of first NFET 120.

$$\text{V\_CTAT2=VGS3+VGS2}, \tag{9}$$

where VGS3 is the gate-source voltage of the third NFET 140, VGS2 is the gate-source voltage of the second NFET 150, and VGS3 is equal to VGS2. Therefore, $$\text{V\_CTAT2} = 2VGS, \tag{10}$$

$$\frac{\partial \text{V\_CTAT1}}{\partial T} = \frac{\partial \text{V\_CTAT2}}{\partial T} = 2\frac{\partial VGS}{\partial T}, \text{ and} \tag{11}$$

$$VGS = \sqrt{\frac{2I_D}{\mu_n C_{ox}\left(\frac{W}{L}\right)}} + V_{th}. \tag{12}$$

Finally, temperature compensation can be determined as follows:

$$\frac{\partial\left(mV_T \ln\left(\frac{I_D}{2\mu C_{ox} V_T^2\left(\frac{W}{L}\right)}\right) + V_{th}\right)}{\partial T} = 2\frac{\partial\left(\sqrt{\frac{2I_D}{2\mu C_{ox}\left(\frac{W}{L}\right)}} + V_{th}\right)}{\partial T}, \text{ and} \tag{13}$$

-continued $$\frac{\partial\left(mV_T\ln\left(\frac{I_D}{2\mu C_{ox}V_T^2\left(\frac{W}{L}\right)}\right)\right)}{\partial T}=2\frac{\partial\left(\frac{2I_D}{2\mu C_{ox}\left(\frac{W}{L}\right)}\right)}{\partial T}+\frac{\partial V_{th}}{\partial T}. \quad (14)$$

Figure 5:
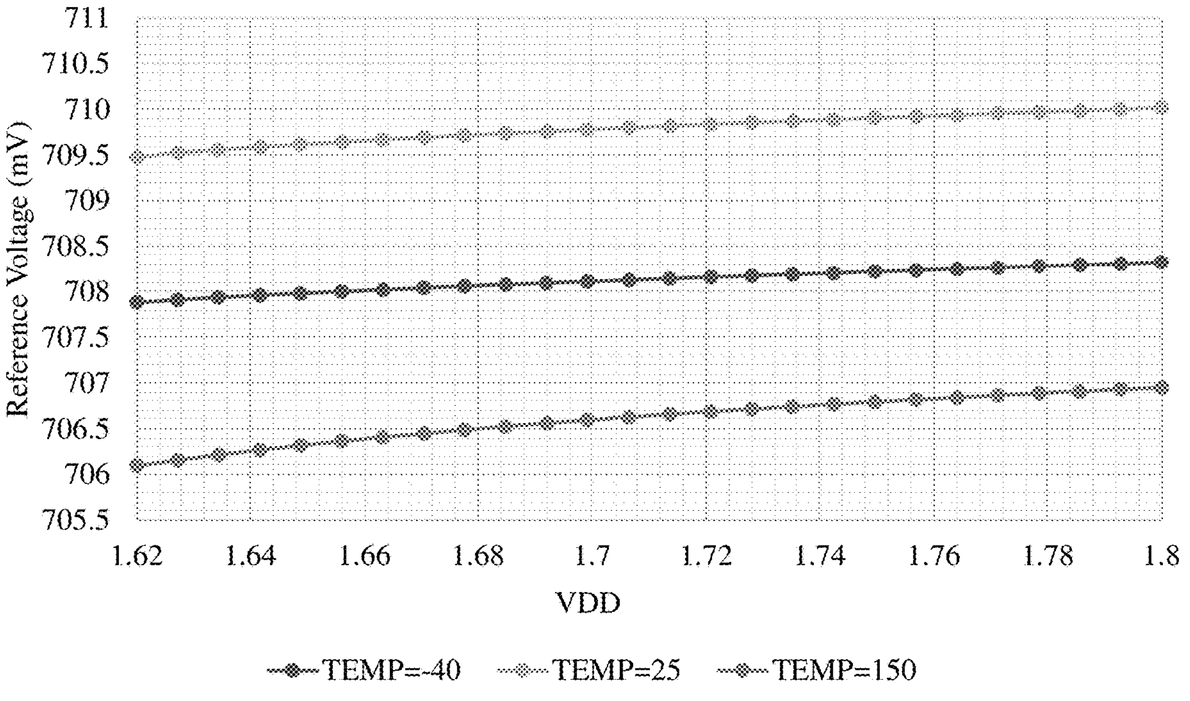
FIG. 5 is a reference voltage-supply voltage diagram illustrating the relationship between changes in a supply voltage and changes in a reference voltage that may be generated by the structure of FIG. 1 at different temperatures.

FIG. 5 is a graph illustrating that structure 1 could optionally be employed to achieve an essentially constant VREF in response to variations in the positive power supply voltage (VDD) if/when the temperature remains essentially constant.

Figure 6:
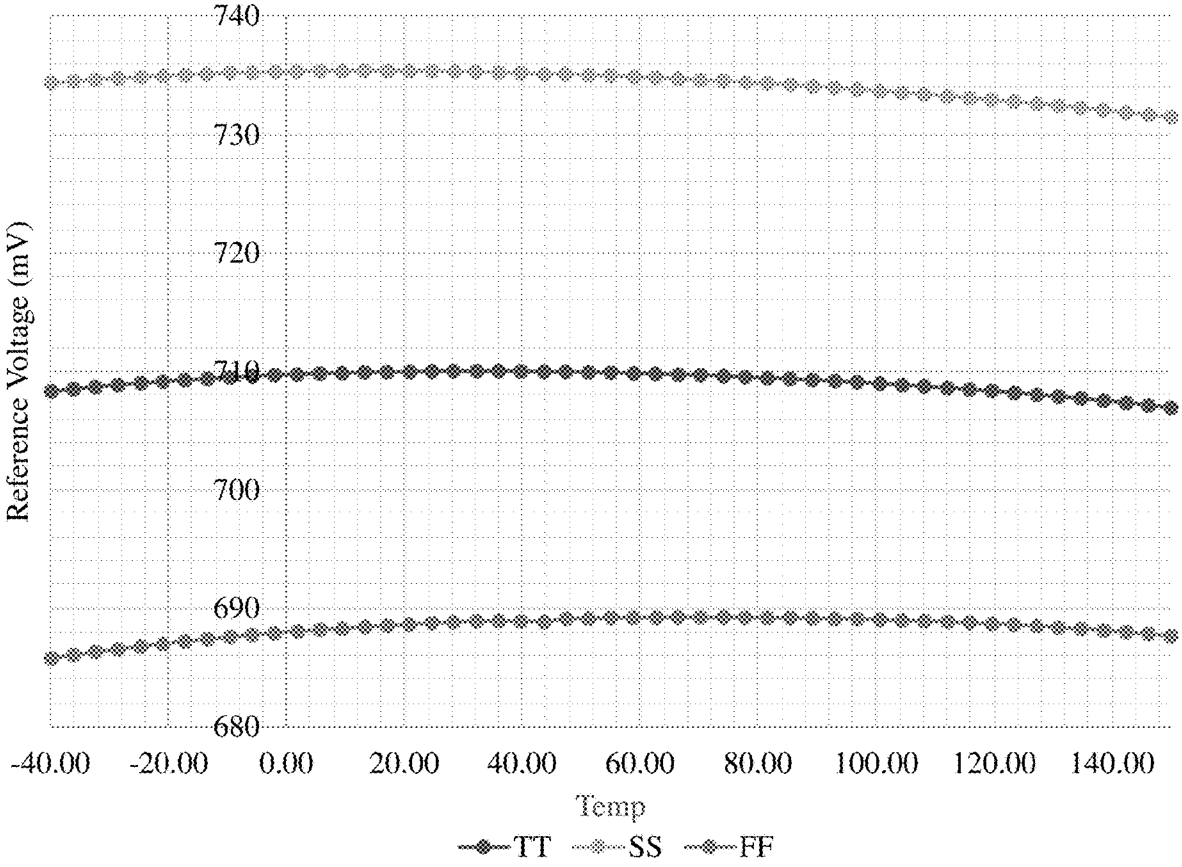
FIG. 6 is a reference voltage-temperature diagram illustrating the relationship between changes in a temperature and changes in a reference voltage that may be generated by the structure of FIG. 1 at different process corners.

FIG. 6 is a graph illustrating that, while the disclosed structure 1 can be employed to achieve an essentially constant VREF across a range of temperatures, this VREF may be different at different process corners. That is, VREF may be relatively low at the fast-fast (FF) process corner, relatively high at the slow-slow (SS) process corner, and somewhere in between at the typical-typical (TT) process corner.

Figure 7:
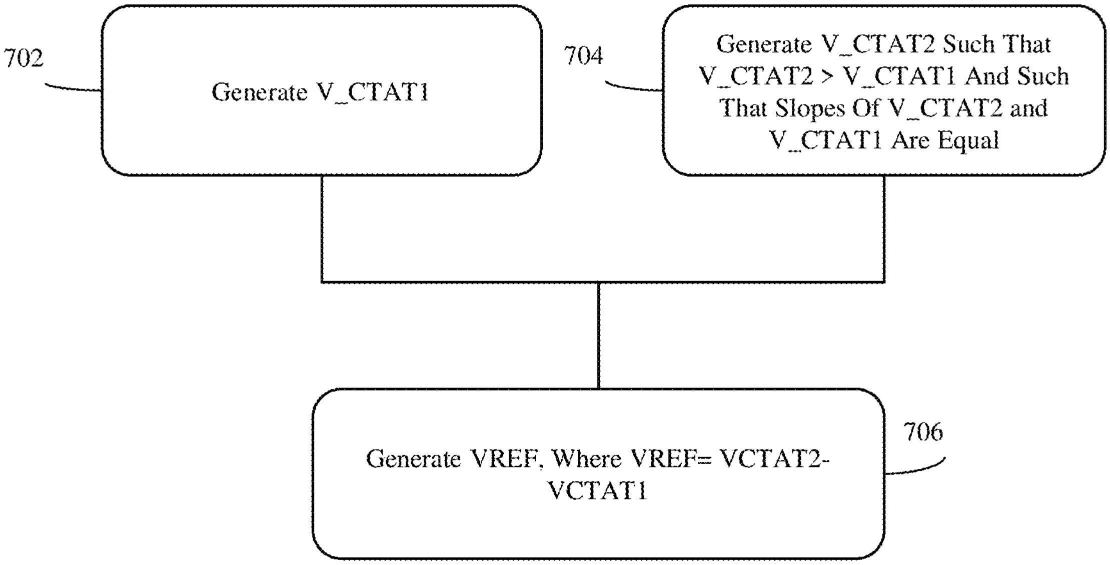
FIG. 7 is a flow diagram illustrating a method for generating a VREF.

FIG. 7 is a flow diagram illustrating embodiments of a method for generating a reference voltage (VREF) that remains essentially constant in response variations in temperature and/or variations in a positive supply voltage. Generally, the method can include providing a structure, such as the structure 1 of FIG. 1 and using the structure to generate a first complementary-to-absolute temperature voltage (V_CTAT1) (see process 702), to generate a second complementary-to-absolute temperature voltage (V_VCTAT2) (see process 704), and to further generate a reference voltage (VREF) that depends on the difference between V_CTAT2 and V_CTAT1 and, more particularly, that is approximately equal to V_CTAT2 minus V_CTAT1 (see process 706). To ensure that VREF is generated to be approximately equal to V_CTAT2 minus V_CTAT1 at process 706, processes 702 and 704 can be performed so that V_CTAT2 is at a higher voltage level than V_CTAT1 and further so that V_CTAT2 and V_CTAT1 exhibit temperature-dependent variations at essentially the same rate. More specifically, V_CTAT2 and V_CTAT1 can be generated at processes 702 and 704 so that the difference between the relatively high V_CTAT2 and the relatively low V_CTAT1 is essentially constant across a range of temperatures (e.g., –40° Celsius (C) and 150° C.). Thus, as illustrated in FIG. 4, lines representing V_CTAT2 and V_CTAT1 across the range of temperatures have essentially the same slope and, thus, VREF remains constant at V_CTAT2 and V_CTAT1 across the same range of temperatures.

It should be understood that in the method and structures described above, a semiconductor material refers to a material whose conducting properties can be altered by doping with an impurity. Exemplary semiconductor materials include, for example, silicon-based semiconductor materials (e.g., silicon, silicon germanium, silicon germanium carbide, silicon carbide, etc.) and III-V compound semiconductors (i.e., compounds obtained by combining group III elements, such as aluminum (Al), gallium (Ga), or indium (In), with group V elements, such as nitrogen (N), phosphorous (P), arsenic (As) or antimony (Sb)) (e.g., GaN, InP, GaAs, or GaP). A pure semiconductor material and, more particularly, a semiconductor material that is not doped with an impurity for the purposes of increasing conductivity (i.e., an undoped semiconductor material) is referred to in the art as an intrinsic semiconductor. A semiconductor material that is doped with an impurity for the purposes of increasing conductivity (i.e., a doped semiconductor material) is referred to in the art as an extrinsic semiconductor and will be more conductive than an intrinsic semiconductor made of the same base material. That is, extrinsic silicon will be more conductive than intrinsic silicon; extrinsic silicon germanium will be more conductive than intrinsic silicon germanium; and so on. Furthermore, it should be understood that different impurities (i.e., different dopants) can be used to achieve different conductivity types (e.g., P-type conductivity and N-type conductivity) and that the dopants may vary depending upon the different semiconductor materials used. For example, a silicon-based semiconductor material (e.g., silicon, silicon germanium, etc.) is typically doped with a Group III dopant, such as boron (B) or indium (In), to achieve P-type conductivity, whereas a silicon-based semiconductor material is typically doped with a Group V dopant, such as arsenic (As), phosphorous (P) or antimony (Sb), to achieve N-type conductivity. A gallium nitride (GaN)-based semiconductor material is typically doped with magnesium (Mg) to achieve P-type conductivity and with silicon (Si) or oxygen to achieve N-type conductivity. Those skilled in the art will also recognize that different conductivity levels will depend upon the relative concentration levels of the dopant(s) in a given semiconductor region.

It should be understood that the terminology used herein is for the purpose of describing the disclosed structures and methods and is not intended to be limiting. For example, as used herein, the singular forms "a," "an," and "the" are intended to include the plural forms as well, unless the context clearly indicates otherwise. Additionally, as used herein, the terms "comprises," "comprising," "includes," and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right," "left," "vertical," "horizontal," "top," "bottom," "upper," "lower," "under," "below," "underlying," "over," "overlying," "parallel," "perpendicular," etc., are intended to describe relative locations as they are oriented and illustrated in the drawings (unless otherwise indicated) and terms such as "touching," "in direct contact," "abutting," "directly adjacent to," "immediately adjacent to," etc., are intended to indicate that at least one element physically contacts another element (without other elements separating the described elements). The term "laterally" is used herein to describe the relative locations of elements and, more particularly, to indicate that an element is positioned to the side of another element as opposed to above or below the other element, as those elements are oriented and illustrated in the drawings. For example, an element that is positioned laterally adjacent to another element will be beside the other element, an element that is positioned laterally immediately adjacent to another element will be directly beside the other element, and an element that laterally surrounds another element will be adjacent to and border the outer sidewalls of the other element. The corresponding structures, materials, acts, and equivalents of all means or step plus function elements in the claims below are intended to include any structure, material, or act for performing the function in combination with other claimed elements as specifically claimed.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various disclosed embodiments have been presented for purposes of illustration but are not intended to be exhaustive or limiting. Many modifications and variations will be apparent to those of ordinary skill in the art without departing from the scope and spirit of the disclosed embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:

a first stage;

a second stage; and an output stage including two field effect transistors having gates connected to receive a first complementary-to-absolute temperature voltage from the first stage and a second complementary-to-absolute temperature voltage from the second stage, respectively, wherein the output stage further outputs a reference voltage dependent on a difference between the second complementary-to-absolute temperature voltage and the first complementary-to-absolute temperature voltage, wherein the two field effect transistors include two N-type field effect transistors connected in series and having front gates connected to receive the first complementary-to-absolute temperature voltage and the second complementary-to-absolute temperature, respectively, and wherein the output stage further includes an output node between the two N-type field effect transistors, wherein the reference voltage is output on the output node.

2. The structure of claim 1, wherein the second complementary-to-absolute temperature voltage is greater than the first complementary-to-absolute temperature voltage, and wherein the reference voltage is constant and approximately equal to the second complementary-to-absolute temperature voltage minus the first complementary-to-absolute temperature voltage.

3. The structure of claim 1, wherein temperature-dependent variations in the second complementary-to-absolute temperature voltage and in the first complementary-to-absolute temperature voltage are at a same rate.

4. The structure of claim 1, wherein each of the two N-type field effect transistors has a source region and a back gate connected to the source region.

5. The structure of claim 1, wherein the output stage further includes a P-type field effect transistor, wherein the two N-type field effect transistors and the P-type field effect transistor are connected in series between a ground rail and a positive supply voltage rail, and wherein the P-type field effect transistor has a front gate connected to receive a bias voltage, a source region connected to the positive supply voltage rail, and a back gate connected to the source region.

6. The structure of claim 1, wherein the reference voltage varies by less than 10% with changes in temperature between −40° Celsius (C) and 150° C.

7. A structure comprising:

a first stage including:

a first N-type field effect transistor and a first P-type field effect transistor connected in series; and a first intermediate node between the first N-type field effect transistor and the first P-type field effect transistor, wherein the first stage outputs a first complementary-to-absolute temperature voltage at the first intermediate node;

a second stage including:

a second N-type field effect transistor, a third N-type field effect transistor, and a second P-type field effect transistor connected in series; and a second intermediate node between the third N-type field effect transistor and the second P-type field effect transistor, wherein the second stage outputs a second complementary-to-absolute temperature voltage at the second intermediate node; and an output stage including:

a fourth N-type field effect transistor, a fifth N-type field effect transistor, and a third P-type field effect transistor connected in series, wherein the fourth N-type field effect transistor and the fifth N-type field effect transistor have front gates connected to receive the first complementary-to-absolute temperature voltage and the second complementary-to-absolute temperature voltage, respectively; and an output node between the fourth N-type field effect transistor and the fifth N-type field effect transistor, wherein the output stage outputs a reference voltage at the output node and the reference voltage is dependent on a difference between the second complementary-to-absolute temperature voltage and the first complementary-to-absolute temperature voltage.

8. The structure of claim 7, wherein the second complementary-to-absolute temperature voltage is greater than the first complementary-to-absolute temperature voltage, and wherein the reference voltage is constant and approximately equal to the second complementary-to-absolute temperature voltage minus the first complementary-to-absolute temperature voltage.

9. The structure of claim 7, wherein temperature-dependent variations in the second complementary-to-absolute temperature voltage and in the first complementary-to-absolute temperature voltage are at a same rate.

10. The structure of claim 7, wherein each field effect transistor has a source region and a back gate connected to the source region.

11. The structure of claim 7, wherein, in the first stage, the first N-type field effect transistor and the first P-type field effect transistor are connected in series between a ground rail and a positive supply voltage rail, wherein, in the second stage, the second N-type field effect transistor, the third N-type field effect transistor, and the second P-type field effect transistor are connected in series between the ground rail and the positive supply voltage rail, wherein the first N-type field effect transistor is larger than both the second N-type field effect transistor and the third N-type field effect, and wherein, in the output stage, the fourth N-type field effect transistor, the fifth N-type field effect transistor, and the third P-type field effect transistor are connected in series between the ground rail and the positive supply voltage rail.

12. The structure of claim 11, further comprising a bias voltage generation circuit, wherein the bias voltage generation circuit outputs a bias voltage, and wherein the first P-type field effect transistor, the second P-type field effect transistor and the third P-type field effect transistor have front gates connected to receive the bias voltage.

13. The structure of claim 11, wherein the first N-type field effect transistor, the second N-type field effect transistor, and the third N-type field effect transistor each include a front gate and a drain region connected to the front gate.

14. The structure of claim 7, wherein the reference voltage varies by less than 10 percent with changes in temperature between −40° Celsius (C) and 150° C.

15. A method comprising:

generating, by a first stage of a structure, a first complementary-to-absolute temperature voltage;

generating, by a second stage of the structure, a second complementary-to-absolute temperature voltage; and generating, by an output stage of the structure, a reference voltage, wherein the output stage includes two field effect transistors having gates connected to receive a first complementary-to-absolute temperature voltage from the first stage and a second complementary-to-absolute temperature voltage from the second stage, respectively, wherein the reference voltage depends on a difference between the second complementary-to-absolute temperature voltage and the first complementary-to-absolute temperature voltage, and wherein the reference voltage is approximately equal to the second complementary-to-absolute temperature voltage minus the first complementary-to-absolute temperature voltage.

16. The method of claim 15, wherein the generating of the first complementary-to-absolute temperature voltage and the generating of the second complementary-to-absolute temperature voltage include generating the second complementary absolute temperature voltage at a higher voltage level than the first complementary-to-absolute temperature voltage.

17. The method of claim 15, wherein the generating of the first complementary-to-absolute temperature voltage and the generating of the second complementary-to-absolute temperature voltage include generating the second complementary absolute temperature voltage so as to exhibit temperature-dependent variations at a same rate as the first complementary-to-absolute temperature voltage.

18. The method of claim 15, wherein the generating of the reference voltage includes generating the reference voltage so as to exhibit a less than 10% change with changes in temperature between −40° Celsius (C) and 150° C.

* * * * *